No. 632,711. Patented Sept. 12, 1899.
H. GANSWINDT.
CHAIN ADJUSTING DEVICE FOR CYCLES.
(Application filed Dec. 27, 1898.)
(No Model.)
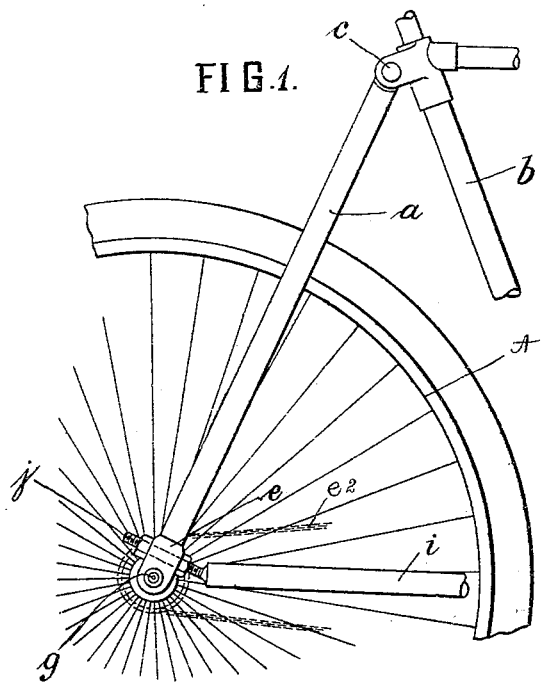
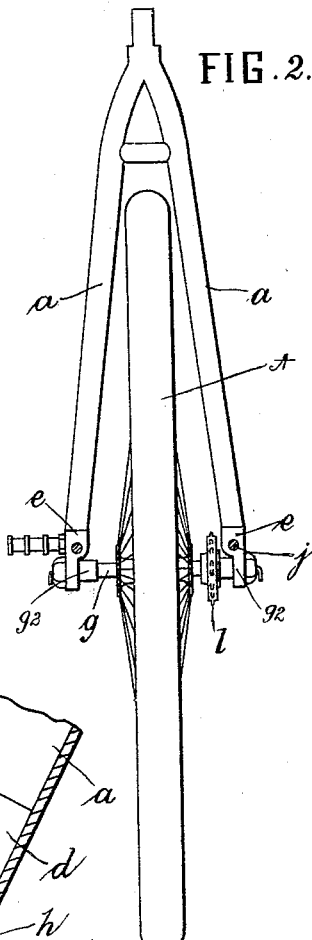
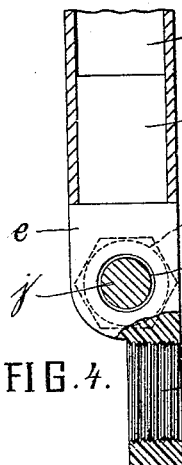
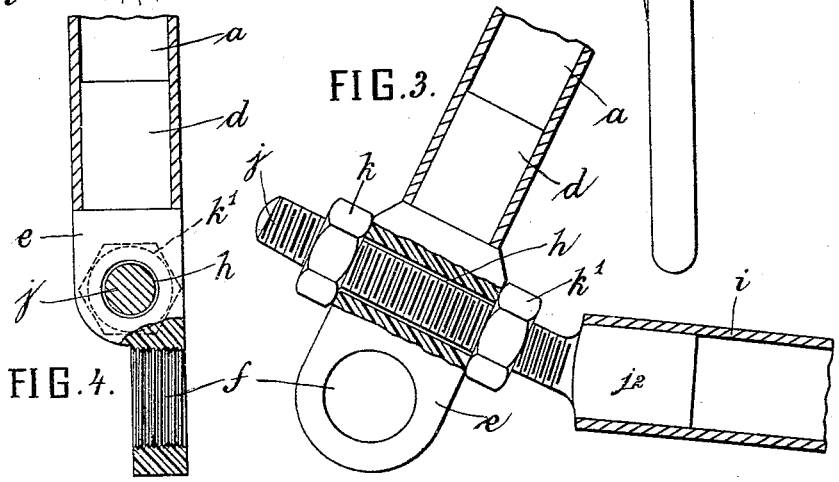
Witnesses
John Buckler
C. C. Olsen
Inventor
Hermann Ganswindt
By Edgar Tate & Co
Attorneys
THE NORRIS PETERS CO., PHOTO-LITHO., WASHINGTON, D. C.

UNITED STATES PATENT OFFICE.

HERMANN GANSWINDT, OF SCHÖNEBERG, GERMANY.

CHAIN-ADJUSTING DEVICE FOR CYCLES.

SPECIFICATION forming part of Letters Patent No. 632,711, dated September 12, 1899.

Application filed December 27, 1898. Serial No. 700,320½. (No model.)

*To all whom it may concern:*

Be it known that I, HERMANN GANSWINDT, a subject of the Emperor of Germany, residing at Mariendorfer Weg, Schöneberg, near Berlin, in the Empire of Germany, have invented certain new and useful improvements in means for adjusting the position of the drive-wheel of a bicycle or similar vehicle so as to take up the slack in the drive-chain, of which the following is a specification, such as will enable those skilled in the art to which it appertains to make and use the same.

The invention is fully disclosed in the following specification, of which the accompanying drawings form a part, in which—

Figure 1 is a side view of a part of the drive-wheel of a bicycle or similar vehicle and that portion of the frame in which it is mounted and showing my improvement; Fig. 2, a back view thereof, and Figs. 3 and 4 sectional details of that part of the frame in which the drive-wheel is mounted.

In the drawings forming part of this specification the separate parts of my improvement are designated by the same letters of reference in each of the views, and in said drawings I have shown at A a part of the drive-wheel of a bicycle or similar vehicle, and said drive-wheel is mounted in the upper fork $a$ and lower fork $i$ of the frame in the usual manner. The upper fork $a$ is pivotally supported at its upper end by means of a pin $c$ and is adapted to swing vertically, and the sides of said fork are provided at their lower ends with heads $e$, having transverse openings $f$, in which the shaft or axle $g$ of the drive-wheel A is mounted. The openings $f$ are screw-threaded and provided with bearings $g^2$, which receive the ends of the shaft or axle $g$ of the drive-wheel, and said heads $e$ are provided with shanks $d$, which enter the lower ends of the sides of the fork $a$. The heads $e$ are also provided with downwardly and forwardly inclined bores $h$, and the sides of the lower fork $i$ are provided at their rear ends with screw-threaded arms $j$, having heads $j^2$ secured in the ends of the sides of said fork, and the arms $j$ project upwardly at an angle to the sides of said fork and pass through the bores $h$ in the heads $e$, and said arms are provided with set-nuts $k$ and $k'$, and by means of this construction the position of the lower end of the fork $a$, in which the drive-wheel A is mounted, may be adjusted forwardly or backwardly, as will be readily understood. The shaft or axle $g$ of the drive-wheel A is also provided with the usual sprocket-wheel $l$, around which passes the usual drive-chain $l^2$, by means of which the sprocket-wheel $l$ is in practice geared in connection with the sprocket-wheel on the pedal-shaft, said last-named sprocket-wheel not being shown.

By adjusting the position of the lower end of the fork $a$ on the arms $j$ by means of the set-nuts $k$ and $k'$ the slack in the drive-chain may be taken up and the said chain tightened on the sprocket-wheels with which it is connected, as will be readily understood, and the tension may thus be regulated at all times.

My improvement is simple in construction and operation and perfectly adapted to accomplish the result for which it is intended, and is also comparatively inexpensive.

Having fully described my invention, I claim as new and desire to secure by Letters Patent—

A bicycle or similar vehicle provided with the usual upper and lower forks in which the drive-wheel is mounted, the upper fork being pivotally supported at its upper end and adapted to swing in a vertical plane, and the sides thereof being provided at their lower ends with supports for the drive-wheel of the vehicle, said supports being provided with inclined bores or passages, and the sides of the lower fork being provided at their rear ends with upwardly-inclined arms which pass through said bores or passages, and means for adjusting said supports on said arms, substantially as shown and described.

In witness whereof I have hereunto set my hand in presence of two witnesses.

HERMANN GANSWINDT.

Witnesses:
FRANZ KOLLM,
ERWIN L. GOLDSCHMIDT.